United States Patent
Morrow

(10) Patent No.: US 11,611,782 B2
(45) Date of Patent: *Mar. 21, 2023

(54) JUST IN TIME CONTENT CONDITIONING

(71) Applicant: Comcast Cable Communications, LLC, Philadelphia, PA (US)

(72) Inventor: Andrew Morrow, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 288 days.

This patent is subject to a terminal disclaimer.

(21) Appl. No.: 16/867,767

(22) Filed: May 6, 2020

(65) Prior Publication Data

US 2020/0267426 A1    Aug. 20, 2020

Related U.S. Application Data

(63) Continuation of application No. 16/116,361, filed on Aug. 29, 2018, now Pat. No. 10,681,396.

(51) Int. Cl.
*H04N 21/234* (2011.01)
*H04N 21/262* (2011.01)
*H04N 21/845* (2011.01)

(52) U.S. Cl.
CPC . *H04N 21/23424* (2013.01); *H04N 21/26241* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 9,066,138 B1 | 6/2015 | Kraiman et al. | |
| 9,674,247 B1 | 6/2017 | Ward et al. | |
| 2012/0198492 A1 | 8/2012 | Dhruv et al. | |
| 2013/0282915 A1* | 10/2013 | Patel | H04L 65/60 709/231 |
| 2014/0344852 A1* | 11/2014 | Reisner | H04N 21/23424 725/32 |
| 2016/0316233 A1* | 10/2016 | Ghadi | H04N 21/4302 |
| 2016/0345074 A1* | 11/2016 | Serbest | H04L 65/65 |
| 2018/0176623 A1 | 6/2018 | Nugent | |
| 2018/0332320 A1* | 11/2018 | Barkley | H04N 21/812 |
| 2019/0037273 A1 | 1/2019 | Ross | |
| 2019/0069004 A1 | 2/2019 | Badawiyeh | |
| 2019/0327505 A1 | 10/2019 | Schwimmer et al. | |

* cited by examiner

Primary Examiner — Jason K Lin
(74) Attorney, Agent, or Firm — BakerHostetler

(57) ABSTRACT

A device may receive a manifest that identifies a plurality of content fragments associated with a content asset. The device may receive or access instructions for inserting secondary content into a location of the content asset that does not align with the boundaries between the content fragments. Based on the received instructions, the playback device may generate updated manifest information that identifies a first modified content fragment and a second modified content fragment. The location for inserting the secondary content in the updated manifest information may align with a new boundary of the first modified content fragment or the second modified content fragment. The device may share the updated manifest information, and may receive a modified manifest file, or content asset, comprising the modified content fragments.

36 Claims, 8 Drawing Sheets

JUST IN TIME CONTENT CONDITIONING

CROSS REFERENCE TO RELATED APPLICATIONS

This patent application is a continuation of Ser. No. 16/116,361, filed Aug. 29, 2018, which is incorporated by reference herein in its entirety.

BACKGROUND

Content delivery systems may allow users to select and watch content assets at the time of their choice rather than having to wait for a specific broadcast time. Content assets may comprise an indication of one or more insertion points for secondary content. In some cases, the content asset may be provided to the content provider with the secondary content. In other cases, the content assets and the secondary content may be generated as separate files and may be delivered at different times. In this latter case, processing of the content asset for transmission to an end user may be delayed until after the secondary content is made available to the content provider, resulting in a delay in viewing the content and decreased customer satisfaction.

SUMMARY

Methods and systems are disclosed for inserting secondary content into one or more content assets. A playback device may receive a manifest from a content provider. The manifest may identify a plurality of content fragments associated with a content asset, such as a Video On Demand (VOD) content asset. The playback device may receive instructions for inserting secondary content, such as an advertisement, into a location of the content asset that does not align with the boundaries of the content fragments. For example, an advertisement insertion point may be located half-way through a two-second content fragment. Based on the received instructions, the playback device may generate updated manifest information that identifies a first modified content fragment having a first playback duration and a second modified content fragment having a second playback duration. The location for inserting the secondary content in the updated manifest information may align with a boundary of at least one of the first modified content fragment and the second modified content fragment. The playback device may send the updated manifest information upstream to video processing equipment, such as servers, transcoders and packagers, and may receive a modified content asset comprising the first modified content fragment and the second modified content fragment. Thus, playback of the content asset may be caused without breaks and delays while placing less burden on the server.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Figure 1:
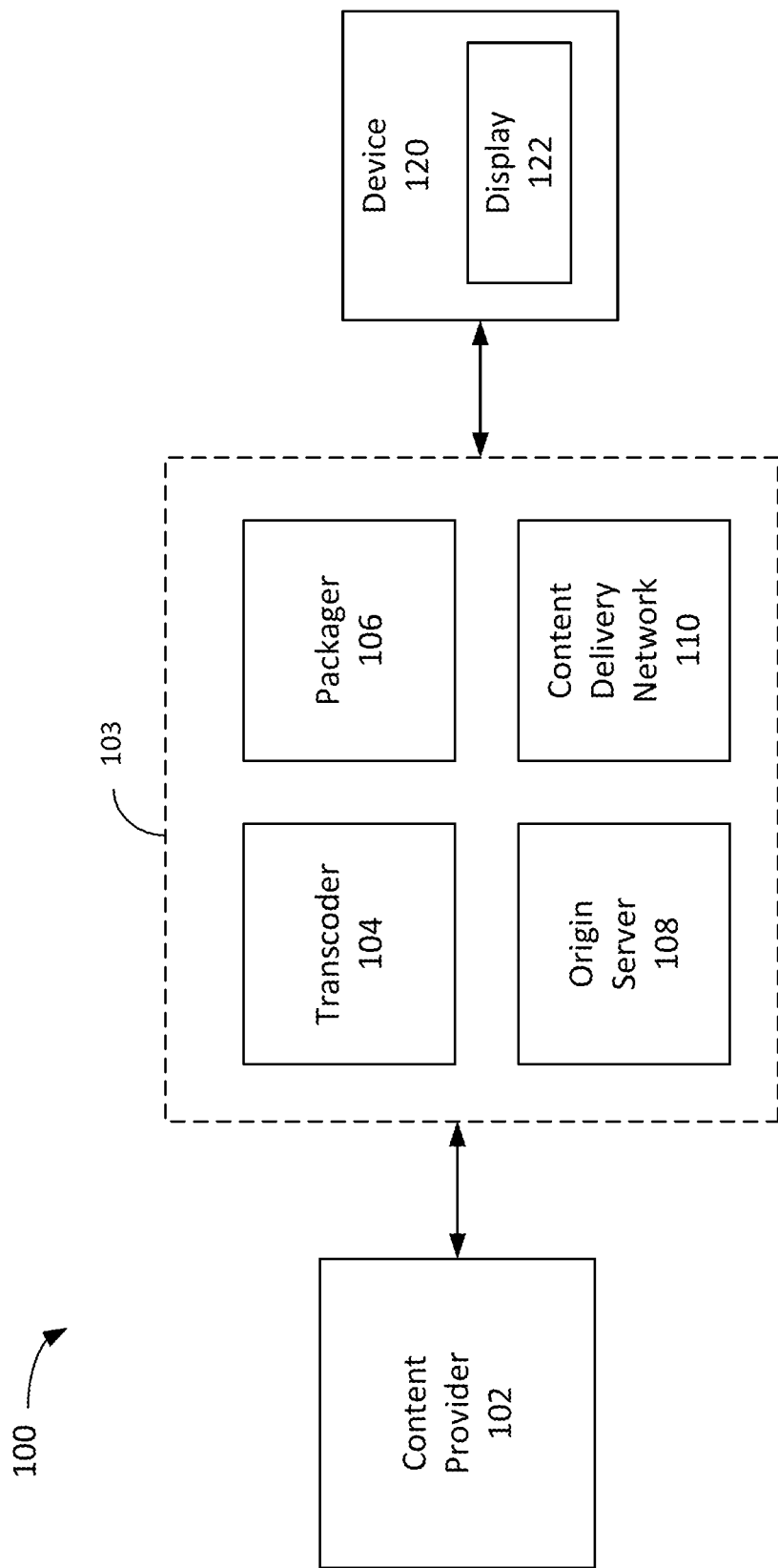
FIG. 1 shows a block diagram of an example system.

A content server may have stored thereon a large number (e.g., hundreds of thousands) of content assets. In many cases, the content assets comprise insertion points for secondary content such as advertisements that do not align with the boundaries of the content fragments. A content asset may comprise a plurality of two-second content fragments, and an advertisement insertion point may be located somewhere in the middle of a given one of those two-second content fragments (e.g., halfway through the fragment). This makes the insertion of secondary content into the content asset difficult as it may only be possible to insert the secondary content at the boundaries or edges of the content fragments. In this case, inserting the secondary content at the boundary of the fragment may cause an undesirable break in the content. One possible solution would be to transcode (or re-transcode) the entire content asset in order to ensure that the insertion points for secondary content align with the content fragment boundaries. However, this solution is undesirable both in terms of cost and the time needed to transcode the large number of content assets.

An alternative solution may be to transcode only a limited number of content fragments such as the content fragments that comprise the secondary content insertion points. For example, if a two-second content fragment comprises an insertion point one second into the fragment, the fragment may be transcoded into a first modified fragment comprising only the first half of the fragment prior to the insertion point. The second portion of the fragment may be transcoded into its own one-second content fragment, or may be joined with an adjacent fragment to create a second modified content fragment that is three seconds in length. A content asset may comprise thousands of content fragments, and only a small number of those fragments may need to be transcoded in order to improve the insertion of secondary content into the content asset. However, this process may still place a heavy burden on the content server. The content server may need to access each of the large number of content assets stored on the server, determine the insertion points of secondary content in each of those content assets, modify each of the content fragments that contain the insertion points, and generate an updated content asset and corresponding manifest.

Methods and systems are described for using a local device such as a playback device to remove some of that burden from the server. The device may receive a manifest from the content server and may determine that a location of an insertion point for secondary content in the manifest does not align with the content fragment boundaries. The device may generate updated manifest information comprising a first modified content fragment and a second modified content fragment such that the insertion point for the secondary content aligns with at least one of the first modified content fragment and the second modified content fragment, and may send this updated manifest to the content server. The content server may then generate a modified content asset based on the updated manifest information. This process places the burden on the local device to determine the insertion points of the secondary content and to generate the updated manifest information. It also removes the need for the server to independently access the large number of stored content assets as the content assets may only be updated once they are accessed by the local device.

FIG. 1 shows an example system 100 in accordance with an aspect of the disclosure. The system 100 may comprise a content provider 102, a device 120, and a plurality of system components 103 including a transcoder 104, a packager 106, an origin server 108, a content delivery network 110. The content provider 102 may be configured to send one or more content assets to the device 120 for playback by the device 120.

The content provider 102 may be configured to receive one or more content assets. The content assets may be received at the content provider 102 as a plurality of content asset fragments. Additionally or alternatively, the content provider 102 may be configured to divide the content asset into a plurality of content fragments. An example content asset may comprise a thirty-minute television show that is divided into 900 fragments such that each content asset fragment represents two-seconds of content. The content provider 102 may be configured to process at least a portion of the content fragments. Processing a portion of the content fragments may comprise adjusting a playback duration of the content fragments such that the portion of the content fragments has a playback duration greater or less than the playback duration (e.g., two seconds) of each of the remaining fragments in the content asset. The portion of the content fragments that are adjusted may comprise pairs of content fragments disposed adjacent a secondary content insertion point. The content provider 102 may be configured to insert secondary content (e.g., an advertisement) in a determined location of the content fragments according to a manifest. The manifest may be generated by the content provider 102, or may be received from the device 120 or some other entity.

The system 100 may comprise a transcoder 104. An input of the transcoder 104 may receive the content asset and secondary content from one or more sources, such as content provider 102, while an output of the transcoder 104 may transmit the transcoded content asset and secondary content to a packager 106. The transcoder 104 may be configured to convert the content asset from one video format to another video format, such as one amenable to the means by which the content provider's users view the content. The content asset may be in any one of a variety of formats, such as, for example, H.264, MPEG-4 Part 2, or MPEG-2. The content asset may be transmitted using one or more standards such as SCTE 35 or other specifications.

Digital audio/video compression may be used, such as MPEG, or any other type of compression. Although reference may be made to example standards (e.g., MPEG) and formats, one of skill in the art will recognize that the systems and methods described herein are applicable to any format or standard that support audio and/or video. As an example, the Moving Pictures Experts Group (MPEG) was established by the International Standards Organization (ISO) for the purpose of generating standards for digital audio/video compression. The combined MPEG-1, MPEG-2, and MPEG-4 standards are hereinafter referred to as MPEG. In an MPEG encoded transmission, content and other data are transmitted in packets, which collectively make up a transport stream. The present methods and systems may employ transmission of MPEG packets. However, the present methods and systems are not so limited, and may be implemented using other types of transmission and data.

The output of a single MPEG audio and/or video codec may be referred to as a transport stream. The transport stream may comprise one or more elementary streams. An elementary stream may be or comprise an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs (e.g., content assets) and their associated PESs may be multiplexed into a multi program transport stream. A multi program transport stream has a program clock reference (PCR) mechanism that allows transmission of multiple clocks, one of which may be selected and regenerated at the decoder.

A multi-program transport stream may comprise a multiplex of audio and video PESs. In addition to the compressed audio, video and data, a transport stream may comprise metadata describing the bit stream. Such metadata may comprise a program association table (PAT) that lists every content asset (e.g., program) in the multi program transport stream. Each entry in the PAT may point to a program map table (PMT) that lists the elementary streams making up each content asset. Some content may be unencrypted, but some content may be subject to conditional access (encryption) and this information is also carried in the metadata. The transport stream may be comprised of fixed-size data packets, for example, each containing 188 bytes. Each packet may carry a program identifier code (PID). Packets in the same elementary stream may all have the same PID, so that the decoder (or a demultiplexer) may select the elementary stream(s) it wants and reject the remainder. Packet continuity counts may ensure that every packet that is needed to decode a stream is received. A synchronization system may be used so that decoders may correctly identify the beginning of each packet and deserialize the bit stream into words.

A content asset, such as a program, may be a group of one or more PIDs that are related to each other. For instance, a multi program transport stream used in digital television might contain three programs, to represent three television channels. In some examples, each channel may comprise one video stream, one or two audio streams, and any necessary metadata. A receiver wishing to tune to a particular "channel" merely has to decode the payload of the PIDs associated with its program. The receiver may discard the contents of all other PIDs.

The transcoder 104 may comprise a fragmentor configured to divide (e.g., segment) the content asset (such as in the event that the program has not yet been segmented) into a plurality of content fragments, or to re-segment the content asset (such as in the event that the program had been previously segmented). A content asset may be segmented into a series of two-second fragments, ten-second fragments, or other fixed or variable time fragments. The terms "fragment" and "segment" may refer to any portion of a content asset and may be used interchangeably herein. It is understood that the fragmentor or functionality associated with the fragmentor may be separate from the transcoder 104. As discussed further herein, the transcoder 104 may be configured to transcode only a portion of a content asset, such as individual content asset fragments. For example, the transcoder may receive an indication generated by the device 120 to transcode a select few of the content asset fragments based on a determination that boundaries for secondary content insertion do not align with those of the existing content asset fragments. Instead of re-transcoding the entire content asset, the transcoder may be configured only to transcode those content fragments near the secondary content insertion point.

The system 100 may comprise a packager 106. An input of the packager 106 may receive the transcoded content asset and secondary content from the transcoder 104 or other source, while an output of the packager 106 may transmit a packaged content asset with inserted secondary content to an origin server 108. The packager 106 may be, for example, a VOD packager. The packager 106 may be configured to insert the secondary content into the content asset fragment boundaries, as discussed herein. The packager 106 may receive the divided content asset and the secondary content from the transcoder 104, insert the one or more secondary content into the content asset, and organize the plurality of content fragments into a packaged content asset. The packaged content asset may be transmitted to a recipient device to facilitate playback. As such, the recipient device may process the packaged content asset and may be directed to access or receive secondary content at certain points during playback, such as the secondary content inserted into the content asset.

The packager 106 may be configured to generate a manifest file associated with the content asset. Generally, a manifest file may contain information describing various aspects of the associated content asset that may be useful for the device 120 to playback the content asset and/or for the content provider 102 to store and retrieve the program. For example, a manifest file may indicate each of the plurality of content fragments, the playback duration of each fragment, the number of fragments, and/or the proper ordering of the fragments necessary to effectuate a playback of the content asset. A manifest file may comprise a network location (e.g., a hyper-text transfer protocol (HTTP) uniform resource locater (URL) link or other universal resource identifier (URI)) for each fragment from which the fragment may be downloaded, accessed, or retrieved. It will be appreciated that the network locations included within a manifest file may point to more than one different location or source. A manifest file may be provided to any of the device 120 in response to a request to receive a program. The device 120 may use the manifest file to determine the fragments required to play the program or a portion of the program and subsequently download the required fragments using the network locations specified in the manifest file. The device 120 may be configured to update manifest information based on information associated with the secondary content, and the send the updated manifest information to the content provider 102. Updating the manifest information may comprise generating a new manifest to include one or more modified content fragments. Updated the manifest information may comprise instructing the packager 106 to generate a new manifest based on the updated manifest information.

The origin server 108 may receive as an input the packaged content asset from the packager 106. The origin server 108 may be configured to receive and fulfill a request from any of the device 120, via the content delivery network 110, to deliver a content asset to the device 120 for playback. The request from the device 120 to deliver the content asset may comprise identifications of the user (e.g., an account identifier, a username and/or a password), the device 120, the requested content asset, and/or a playback time point or temporal location. In certain aspects, the request to deliver the content asset may reflect a user skipping to a particular portion of a content asset of which the initial segments of the content asset have already been delivered and are being played on the device 120. Upon receiving a request to deliver a content asset to the device 120, the origin server 108 may provide one or more manifest files to the device 120 via the content delivery network 110 that describe the program and segments thereof, including network locations from which each segment may be downloaded. Using the manifest file, the device 120 may iteratively download and begin playback of the content asset.

The content delivery network (CDN) 110 may be configured to act as an intermediary server located between the device 120 and the content provider 102. More particularly, the CDN 110 may serve cached objects to device 120 and may manage some or all aspects of the cached objects of device 120. Such architecture may reduce the cost, resource, and bandwidth usage and may improve the security of device 120. For example, instead of validating the cached objects by committing various resources and using bandwidth to connect to a plurality of network-based resources, the device 120 needs only to request the validation from the content delivery network 110. In turn, the content delivery network 110 may connect to the plurality of network-based resources, such as the origin server 108, to refresh the cached objects, and return the refreshed objects to the device 120.

The device 120 may be at least one of a set-top box, a streaming video player, a laptop, a television, a smartphone, a tablet, a desktop computer, or any other device capable of presenting content to a user. The user may interact with the content provider 102 via a user interface associated with the device 120 in order to request a content asset from the content provider 102 and to otherwise interact with the content asset. The device 120 may comprise any combination of a hardware element, such as a set-top cable box, or a software element, such as a web browser or other software adapted to playback video. The device 120 may comprise a display 122 for displaying content to a user of the device 120. It is understood that the display may be part of the device 120, such as in the example that the device 120 is a tablet, or may be located externally to the device, such as in the example that the device 120 is a set-top box and the display 122 is a television set connected to the set-top box.

Figure 2:
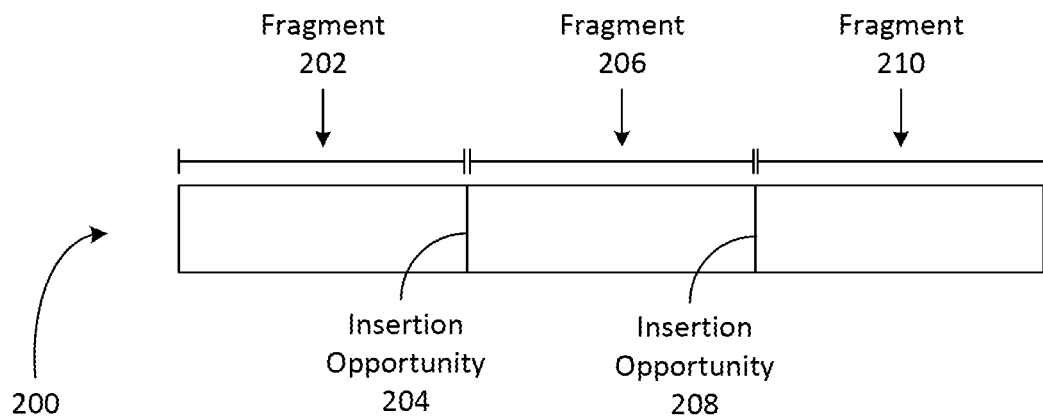
FIG. 2 shows an example segmented content asset.

FIG. 2 shows an example content asset 200. The content asset 200 may comprise a plurality of content fragments which have been processed based on the known location of the content insertion opportunities. The content asset 200 may be delivered using an Internet Protocol (IP) delivery mechanism. The content asset 200 may be divided into a plurality of content fragments, such as content fragments 202, 206, and 210 shown in FIG. 2. Each of the content fragments 202, 206, 210 may have an equal playback duration, for example, two-seconds. Segmenting of the content assets into a plurality of content fragments, as shown in FIG. 2, may be performed by the fragmentor associated with the transcoder 104 in order to rebalance the use of the network resources based on the number of customers available to the content provider. Fragments when combined with multiple bitrates may reduce strain on the network and allow the content provider to connect to a larger customer base. Smaller content fragments may allow the content provider to react quickly to changes in demand on the network. On the other hand, generating content assets that are too short may result in too much time spent on requesting a new file.

Placement opportunities for secondary content such as an advertisement may be inserted at the content fragment boundaries (e.g., before or after any one of the content fragments 202, 206, and 210). FIG. 2 shows a content asset 200 comprising a content asset fragment 202, followed by a first placement opportunity 204, a second content asset fragment 206, followed by a second placement opportunity 208, and a third content asset fragment 210. Each content asset fragment may comprise multiple content fragments and may comprise, for example, a video asset, an audio asset, or a combination of the two, as discussed herein.

The content provider 102 may be configured to provide a manifest to the device 120. In addition to identifying all of the files that make up the content asset, the manifest may also comprise information associated with the opportunities to insert or replace secondary content in the content assets. Insertion of secondary content in IP delivery is generally easy because the fragment boundaries are aligned with the placement opportunities.

In some content delivery systems, such as video on demand (VOD) systems, the content asset and the secondary content may be separate files received at different times and/or from different entities. This may be a problem for the content provider, who may wish to process the content asset and the secondary content together and allow them to be viewed at the beginning of the license window, which represents the time that a content provider may offer the content asset to its customers. Content providers may wish to provide the content as close to the start of the license window as possible. In order to meet these needs, content providers may choose to process the content asset without knowing the locations of the insertion points and may make the content asset available to customers without the secondary content. However, when the secondary content becomes available at a later time, the fragment boundaries may not necessarily align with the secondary content insertion points.

Figure 3:
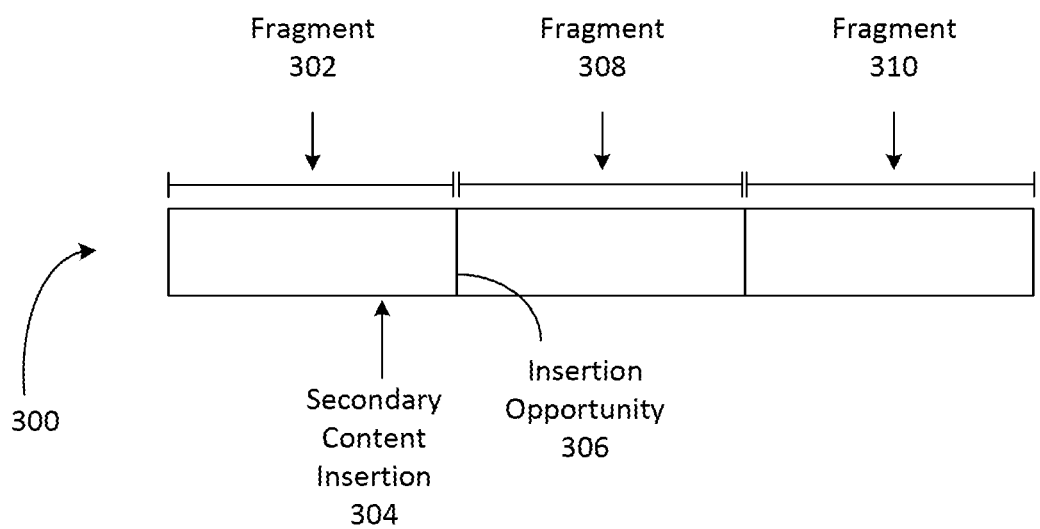
FIG. 3 shows an example segmented content asset.

As shown in FIG. 3, the content asset 300 may comprise any number of content fragments, such as content fragment 302, content fragment 308, and content fragment 310. The content asset 300 may have been processed (e.g., transcoded) by video processing devices prior to the secondary content being available. The content asset may be segmented into a plurality of content fragments in order to provide the user with the content asset either without any secondary content or with current/existing secondary content received by the content provider prior to making the content asset 300 available for playback. The content asset may be segmented, for example, by one or more of the content provider, storage facilities, CDN operators, etc. The content asset, as originally processed, may identify a secondary content insertion point 306 after content asset 302. However, due to new or changing conditions, the secondary content insertion point may need to be changed. For example, instructions associated with the secondary content may indicate that the secondary content is to be inserted at a location that does not align with the fragment boundaries. For a content fragment that is two seconds in length spanning from two minutes and thirty seconds to two minutes and thirty-two seconds, the instructions may indicate that the secondary content is to be inserted in the content asset at a location corresponding to two the two minute and thirty-one second mark. This may result in the secondary content interrupting the content asset fragment, leading to undesired results and user dissatisfaction. If the received secondary content identifies an advertisement replacement, some portion of the original advertisement may be presented. Additionally or alternatively, the secondary content may have a condition such that it cannot be played until the implemented secondary content start time 306, leading to a portion of the secondary content being cut off. This may result in dissatisfied advertisers and a reduction in advertising profits for the content provider.

As discussed herein, the content asset may be processed twice, a first time when the content asset is received and a second time when the secondary content properties become known or the secondary content is received. This process may allow the content asset to be offered as soon as possible, while still allowing the content provider to insert secondary content as needed. However, there are costs and time delays associated with processing of the content asset multiple times.

Additionally or alternatively, the content asset may be withheld from users by the content provider 102 until the secondary content is received. This may prevent the content provider from facing the problems discussed herein, including the associated costs and time delays. However, this may also result in a reduced number of the total views as customers may be displeased with the unpredictable delay in viewing the content. By choosing to wait until the secondary content has been received to process the content asset to make it available to users, content providers may suffer a potential loss of revenue.

Figure 4:
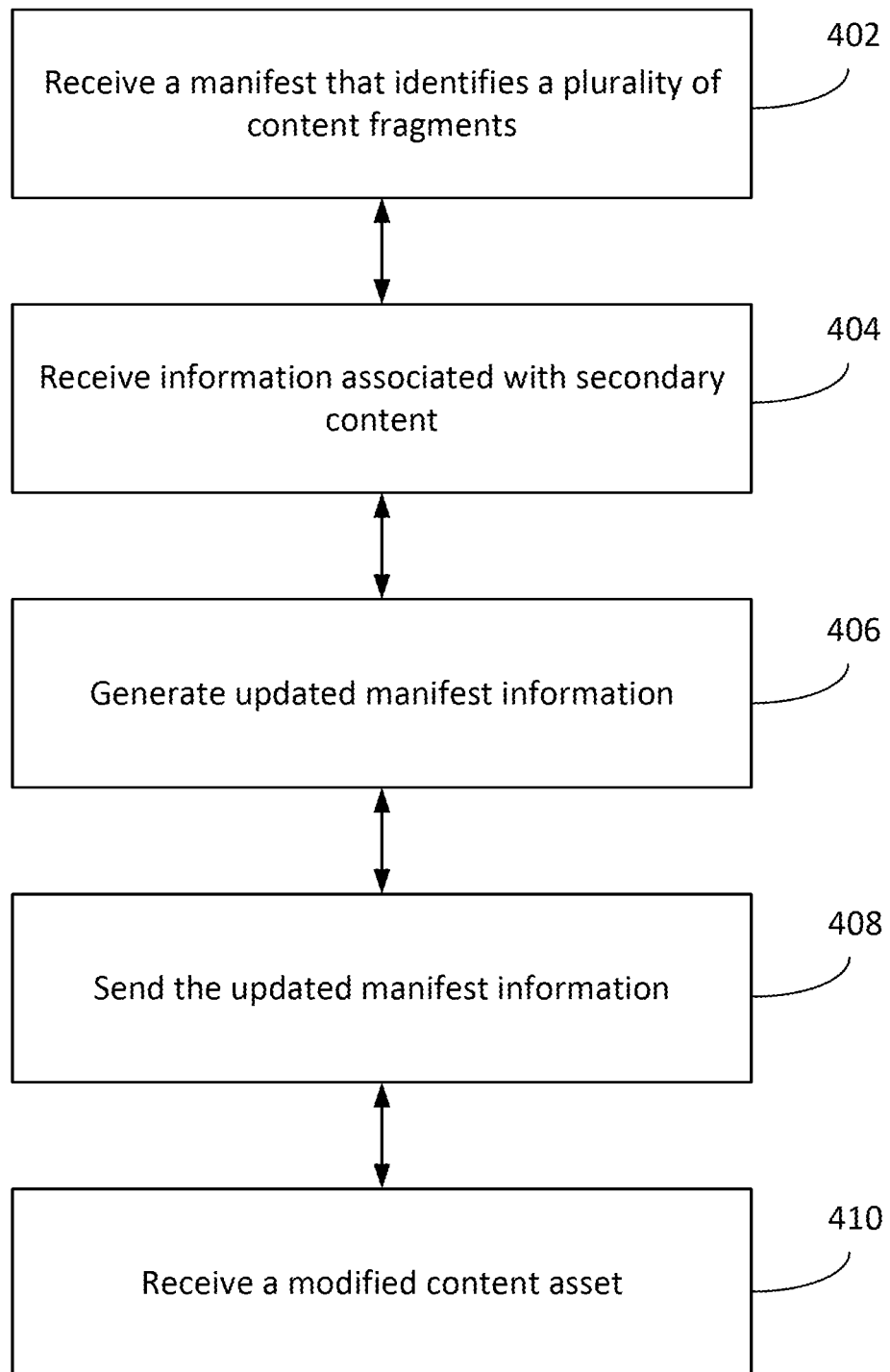
FIG. 4 shows a flow chart of an example method.

FIG. 4 shows a flow chart of an example method 400. At step 402, a manifest may be received. The manifest may be received at a device, such as the device 120 shown in FIG. 1. The device may be any device adapted for receiving, processing, rendering and/or displaying content, such as a user device, set-top box, display device, etc. The manifest may be associated with a content asset. The content asset may be a movie, television, or audio program made available to the device by a content provider. The content asset may have associated applications and interactive content. The content asset may be divided into a plurality of content fragments. Each of the content fragments may represent a portion of the content asset. An example content asset may comprise a thirty-minute television show that is divided into 900 fragments such that each content fragment represents two-seconds of content.

At step 404, information associated with secondary content may be received. The information may identify a location in the content asset to insert the secondary content. The secondary content may be an advertisement, such as an advertisement that is part of a campaign, or a personalized advertisement directed at the device, the user of the device or a household. The secondary content may also be any type of content capable of being inserted into the content asset (e.g., an application, interactive content, other media data). The location to insert the secondary content may fall within a duration of an existing content fragment. In the example that each content fragment is two seconds in length, the information may indicate to insert the secondary content halfway through the content fragment (e.g., one second into the content fragment). It is desirable to insert secondary content at an encoded boundary point, for example, when secondary content is such that it can only be inserted at boundary point, such as an advertisement. The fragment boundaries may represent the space between content fragments, right before the start of a content fragment or immediately following a content fragment. The device may determine that one or more fragment may need to be processed in order to accommodate insertion of a fragment boundary point, and therefore enable insertion of the secondary content at the desired location.

At step 406, a request for updated manifest information may be generated. The updated manifest information may be generated by the device. The updated manifest information may identify a first modified content fragment and a second modified content fragment. The first modified content fragment may have a first playback duration and the second modified content fragment may have a second playback duration. The first and second playback durations may be different. The manifest may additionally or alternatively identify the secondary content for insertion into the content asset. The information associated with the secondary content may comprise an instruction to insert the secondary content at, for example, the one second mark or halfway through a content fragment that is two-seconds in length. Based on this information, the device may generate updated manifest information comprising a first modified content fragment. The first modified content fragment may be the first second of the content fragment and may only be one second in length. The secondary content may be inserted at the boundary of the first modified content fragment. Thus, the manifest may identify a one second content fragment followed by the secondary content.

The remaining portion of the first content fragment may be joined with a second content fragment that follows the secondary content. A second modified content fragment may be generated that is three seconds in length (e.g., the remaining one second portion of the first content fragment and the two-second portion of the second content fragment). Thus, the first modified content fragment may be generated based on a first one of the content fragments and the second modified content fragment may be generated based on a second one of the content fragments. The second modified content fragment may comprise the second content fragment and a portion of the first content fragment. Additionally or alternatively, the remaining portion of the first content fragment may be independently processed to form another one second content fragment immediately following the secondary content.

At step 408, the updated manifest information may be sent to the content server. The updated manifest information may be sent to the same content server that sent the original manifest to the device. Additionally or alternatively, the updated manifest information may be sent to another content server that is configured to generate an updated content asset or to modify one or more fragments of an existing content asset. The content server may be configured to generate the modified content asset by modifying only the portion of the content asset that was modified in the updated manifest information. In an example that the content asset comprises 900 two-second content fragments with three scheduled thirty-second advertising breaks, the manifest may identify six modified content fragments, one modified content fragment just prior to each advertising break and one modified content fragment immediately following each advertising break. Thus, the content server may modify six of the content fragments and may insert the secondary content identified by the manifest into the content asset. The content server may not need to modify any of the remaining 894 content fragments.

At step 410, a modified content asset may be received at the device. The modified content asset may comprise the first modified content fragment and the second modified content fragment. The modified content asset may comprise the secondary content. The modified content asset may comprise a portion of the original content fragments identified in the manifest. Each of the original content fragments may have an equal playback duration (e.g., two seconds). This playback duration may be different than the playback duration of the first modified content fragment and the second modified content fragment. The first modified content fragment may have a playback duration of one second, and the second content fragment may have a playback duration of three seconds. Thus, the modified content asset may comprise a plurality of content fragments having an equal playback duration, a first modified content fragment having a playback duration different from the playback duration of the plurality of content fragments, and a second modified content fragment having a playback duration different than the playback duration of the first modified content fragment and the plurality of content fragments. In one example, the modified content asset may further comprise the secondary content.

While the description of FIG. 4 describes the steps of that figure as being performed by a device, it is understood that the device is not limited to the device 120 and that the steps may be performed by one or more other entities or components of the system 100.

Content providers, using the methods above, may perform a mixture of secondary content replacement and secondary content insertion. Secondary content included in a first broadcast in VOD may be stale after a certain period of time, for example, months later. Using the methods described herein, a content asset, such as a video asset, may be formatted and secondary content may be seamlessly inserted into the content asset without the need to reprocess the entire content asset.

Each of the plurality of content fragments may start with a self-contained frame. For example, this may be an IDR-frame in MPEG-4 nomenclature, or an I-frame in MPEG-2 nomenclature, that does not require any other previous video data to display. Additionally or alternatively, each audio segment may start with an audio access unit that does not require any previous audio data to begin to play. As discussed herein, when the processing is done in absence of the information of the knowledge of the advertisement opportunities, it is extremely unlikely that advertisement opportunities will align with the segment boundaries. Re-processing the entire content asset is possible, but time consuming. Since the fragments are already meant to be independent of each other, it is possible to restrict the reprocessing to just the fragments that contain the secondary content, as discussed herein. Since the secondary content does not have any effect on the remaining content fragments, there is no need to waste time and resources reprocessing the entire content asset. When an updated content asset is generated, the modified fragments may be self-contained (e.g., each modified content fragment may contain its own I-frame and may not be dependent on other fragments for playback).

Figure 5:
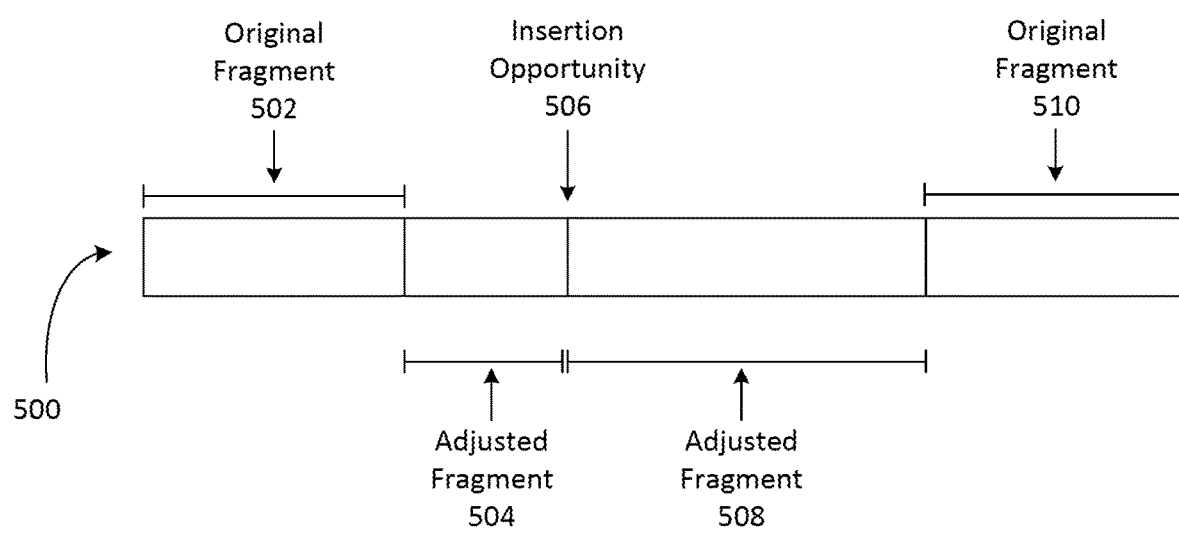
FIG. 5 shows an example modified segmented content asset.

FIG. 5 shows an example modified content asset 500. A content provider may be configured to receive updated manifest information from a device such as a playback device. The updated manifest information may identify one or more modified content fragments of a content asset and an insertion point for secondary content in the content asset. Instead of processing the entire content asset, only the content fragments immediately before and immediately after the location of the insertion point may need to be processed. Thus, in an example where a content asset comprises four content fragments and one instance of secondary content, only two of the content fragments need to be processed. As shown in FIG. 5, the processed content asset may comprise original asset fragment 502, adjusted content fragment 504, secondary content 506, adjusted content fragment 508, and original asset fragment 510. This allows the secondary content to be seamlessly integrated with the content asset without the need to re-process the entire content asset, thus saving considerable time and money.

Suppose that in FIG. 5, each of the plurality of content fragments is two seconds long prior to being adjusted for the insertion of secondary content. The first fragment may span from 0-2 seconds, the second fragment from 2-4 seconds, the third fragment from 4-6 seconds, and the fourth fragment from 6-8 seconds. Since the secondary content is to be inserted in the content asset after the second asset fragment, only that fragment and the fragment immediately following the secondary content may need to be processed. Thus, the final result may be an original first fragment from 0-2 seconds, an adjusted fragment from 2-3 seconds followed by the secondary content, a second adjusted fragment from 3-6 seconds, followed by a second original fragment from 6-8 seconds.

Figure 6:
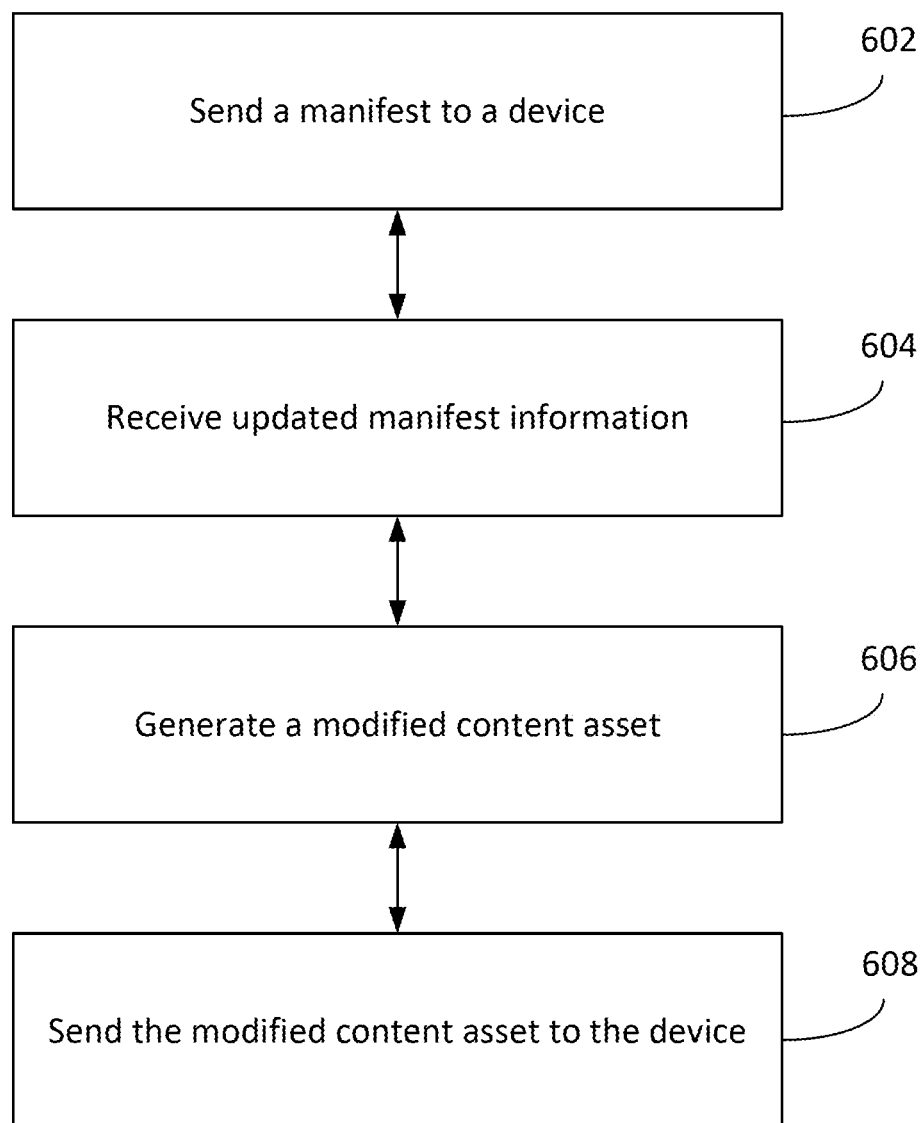
FIG. 6 shows a flow chart of an example method.

FIG. 6 shows a flow chart of an example method 600. At step 602, a manifest may be sent to a device, such as the device 120 shown in FIG. 1. The device may be a playback device such as a set-top box. The manifest may be associated with a content asset. The content asset may be a movie, television, or audio program made available to the device by a content provider. The content asset may be divided into a plurality of content fragments. Each of the content fragments may represent a portion of the content asset. An example content asset may comprise a thirty-minute television show that is divided into 900 fragments such that each content fragment represents two-seconds of content.

At step 604, updated manifest information may be received. The updated manifest information may identify a first modified content fragment based on a first one of the plurality of content fragments and a second modified content fragment based on a second one of the plurality of content fragments. The first modified content fragment may have a first playback duration and the second modified content fragment may have a second playback duration that is different than the first playback duration. The updated manifest information may identify a location in the content asset to insert secondary content. The secondary content may be an advertisement, such as a personalized advertisement directed at the device, or any type of content capable of being inserted into the content asset.

The updated manifest information may have been generated by the device based on a determination at the device that the location for insertion of secondary content falls within a duration of either the first content fragment or the second content fragment. For example, instructions for inserting the secondary content at the one second mark or halfway through a content fragment that is two-seconds in length may be received at the device. Based on this information, the device may generate updated manifest information comprising a first modified content fragment. The first modified content fragment may be the first second of the content fragment and may only be one second in length. The secondary content may be inserted at the boundary of the first modified content fragment. Thus, the manifest may identify a one second content fragment followed by the secondary content.

The remaining portion of the first content fragment may be joined with a second content fragment that follows the secondary content. A second modified content fragment may be generated that is three seconds in length (e.g., the remaining one second portion of the first content fragment and the two-second portion of the second content fragment). Thus, the first modified content fragment may be generated based on a first one of the content fragments and the second modified content fragment may be generated based on a second one of the content fragments. The second modified content fragment may comprise the second content fragment and a portion of the first content fragment. Additionally or alternatively, the remaining portion of the first content fragment may be independently processed to form another one second content fragment immediately following the secondary content.

At step 606, a modified content asset may be generated. The modified content asset may comprise the first modified content fragment and the second modified content fragment. The modified content asset may comprise the secondary content. The modified content asset may comprise a portion of the original content fragments identified in the manifest. Each of the plurality of original content fragments may have an equal playback duration (e.g., two seconds). The playback duration of the plurality of content fragments may be different than the playback duration of the first modified content fragment and the second modified content fragment. The first modified content fragment may have a playback duration of one second, and the second content fragment may have a playback duration of three seconds. Thus, the modified content asset may comprise a plurality of content fragments having an equal playback duration, a first modified content fragment having a playback duration different from the playback duration of the plurality of content fragments, a second modified content fragment having a playback duration different than the playback duration of the first modified content fragment and the plurality of content fragments, and the secondary content.

At step 608, the modified content asset may be sent to the device. In an example that the content asset comprises 900 two-second content fragments with three scheduled thirty-second advertising breaks, the modified content asset may comprise six modified content fragments, one modified content fragment just prior to each advertising break and one modified content fragment immediately following each advertising break. Thus, the content server may send to the device an updated content asset comprising six modified content fragments and secondary content inserted into the corresponding location of the content asset. The content server may not need to modify any of the remaining 894 content fragments. The content server may send to the device only the modified content fragments and/or the secondary content. Additionally or alternatively, the content server may send to the device the updated content asset comprising the modified content fragments, the secondary content, and the plurality of original content fragments.

Figure 7:
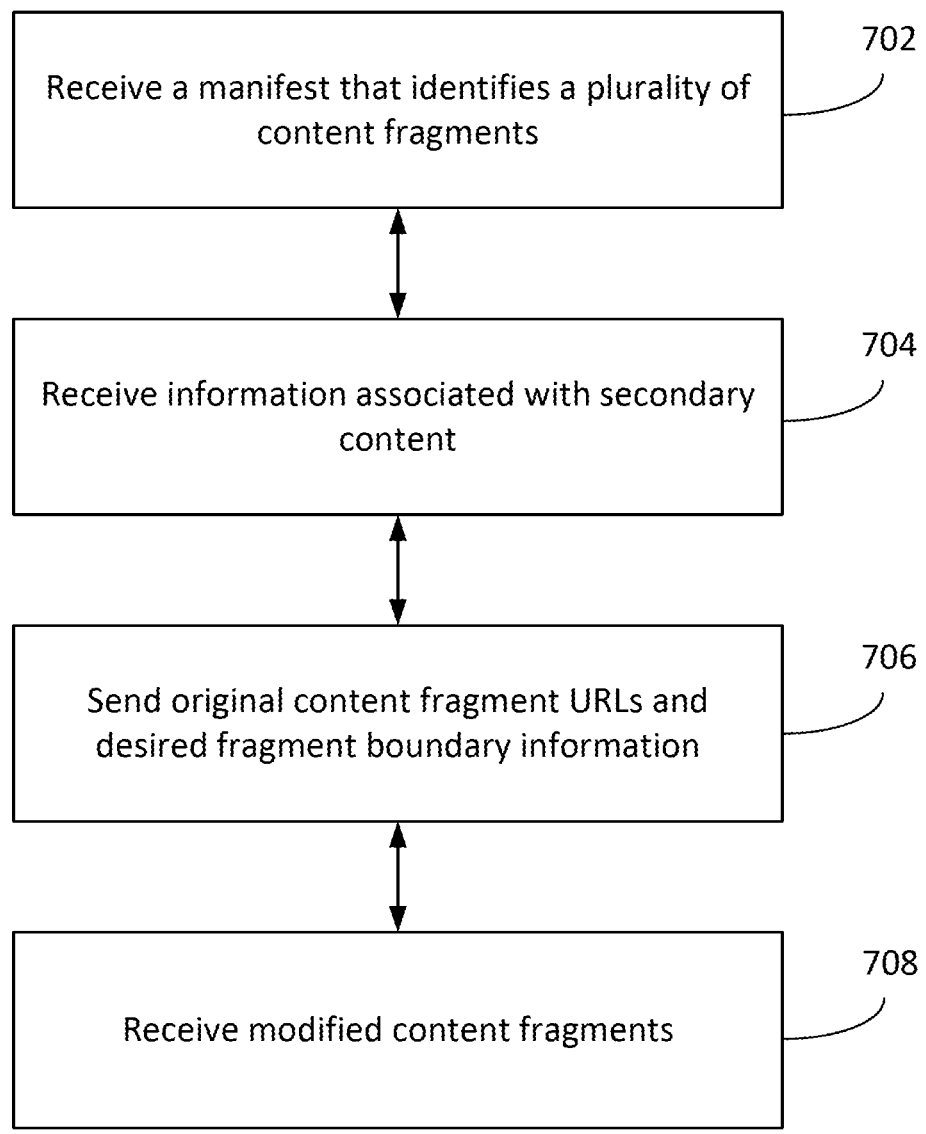
FIG. 7 shows a flow chart of an example method.

FIG. 7 shows a flow chart of an example method 700. At step 702, a manifest may be received. The manifest may be received at a device, such as the device 120 shown in FIG. 1. The device may be a playback device such as a set-top box. The manifest may be associated with a content asset. The content asset may be a movie, television, or audio program made available to the device by a content provider. The content asset may be divided into a plurality of content fragments. Each of the content fragments may represent a portion of the content asset. An example content asset may comprise a thirty-minute television show that is divided into 900 fragments such that each content fragment represents two-seconds of content.

At step 704, information associated with secondary content may be received or accessed. The information may identify the secondary content and a location in the content asset to insert the secondary content. The secondary content may be an advertisement, such as a personalized advertisement directed at the device, or any type of content capable of being inserted into the content asset. The information associated with the secondary content may be received from an advertisement placement service. The information associated with the secondary content may be accessed by the device from at least one of remote storage or local storage. The location to insert the secondary content may fall within a duration of a given one of the content fragments. In the example that each content fragment is two seconds in length, the information may indicate to insert the secondary content halfway through the content fragment (e.g., one second into the content fragment). However, content such as the secondary content may only be capable of being inserted at the content fragment boundaries and not within the fragments themselves. The fragment boundaries may represent the space between content fragments, right before the start of a content fragment or immediately following a content fragment. The device may determine that at least this fragment may need to be processed in order to enable insertion of the secondary content at the desired location.

The device may be configured to generate updated manifest information based on the received information. The updated manifest information may identify a first modified content fragment and a second modified content fragment. The first modified content fragment may have a first playback duration and the second modified content fragment may have a second playback duration that is different than the first playback duration. The manifest may additionally or alternatively identify the secondary content. The information associated with the secondary content may comprise an instruction to insert the secondary content at the one second mark or halfway through a content fragment that is two-seconds in length. Based on this information, the device may generate updated manifest information comprising a first modified content fragment. The first modified content fragment may be the first second of the content fragment and may only be one second in length. The secondary content may be inserted at the boundary of the first modified content fragment. Thus, the manifest may identify a one second content fragment followed by the secondary content.

The remaining portion of the first content fragment may be joined with a second content fragment that follows the secondary content. A second modified content fragment may be generated that is three seconds in length (e.g., the remaining one second portion of the first content fragment and the two-second portion of the second content fragment). Thus, the first modified content fragment may be generated based on a first one of the content fragments and the second modified content fragment may be generated based on a second one of the content fragments. The second modified content fragment may comprise the second content fragment and a portion of the first content fragment. Additionally or alternatively, the remaining portion of the first content fragment may be independently processed to form another one second content fragment immediately following the secondary content.

At step 706, the device may send to a server information associated with the first content fragment and the second content fragment, such as an identifier (e.g., a URL) of the first content fragment and the second content fragment. The server may be a just-in-time server configured to generate a small number of modified content fragments on the fly. The device may additionally or alternatively send to the server information associated with the boundary points of the first modified content fragment and the second modified content fragment. The device may not send to the server the updated manifest information.

The server, based on the information received from the device, may generate a request to retrieve the first content fragment and the second content fragment. The request may be sent to any of the entities associated with the system 100 shown in FIG. 1, such as the content provider 102 or content delivery network 110. The server may receive the first content fragment and the second fragment and may be configured to generate a first modified content fragment and a second modified content fragment based on the information received from the device. The server may cache or otherwise store the first modified content fragment and the second modified content fragment on the server. The first modified content fragment and the second modified content fragment may be stored on the server with an associated identifier or pointer, such the URL of the first content fragment and/or the second content fragment. Thus, when a future request is received at the device to modify the first content fragment and/or the second content fragment, whether from the same device or from another device, the just-in-time server may use the cached result, thereby reducing the load on the server. The server may be configured to send to the device the first modified content fragment and the second modified content fragment.

At step 708, the first modified content fragment and the second modified content fragment may be received at the device. The device may be configured to generate a modified content asset comprising the first modified content fragment and the second modified content fragment in accordance with the updated manifest information. The device may be configured to insert the secondary content into the location of the content asset identified by the received information associated with the secondary content, such as at the boundary of the first modified content fragment and the second modified content fragment.

The modified content asset may comprise a portion of the original content fragments identified in the manifest. Each of the original content fragments may have an equal playback duration (e.g., two seconds). This playback duration may be different than the playback duration of the first modified content fragment and the second modified content fragment. The first modified content fragment may have a playback duration of one second, and the second content fragment may have a playback duration of three seconds. Thus, the modified content asset may comprise a plurality of content fragments having an equal playback duration, a first modified content fragment having a playback duration different from the playback duration of the plurality of content fragments, a second modified content fragment having a playback duration different than the playback duration of the first modified content fragment and the plurality of content fragments, and the secondary content. The device may be configured to render and cause presentation of the content asset including the first modified content fragment and the second modified content fragment.

While the description of FIG. 7 describes the steps of that figure as being performed by a device, it is understood that the device is not limited to the device 120 and that the steps may be performed by one or more other entities or components of the system 100.

Figure 8:
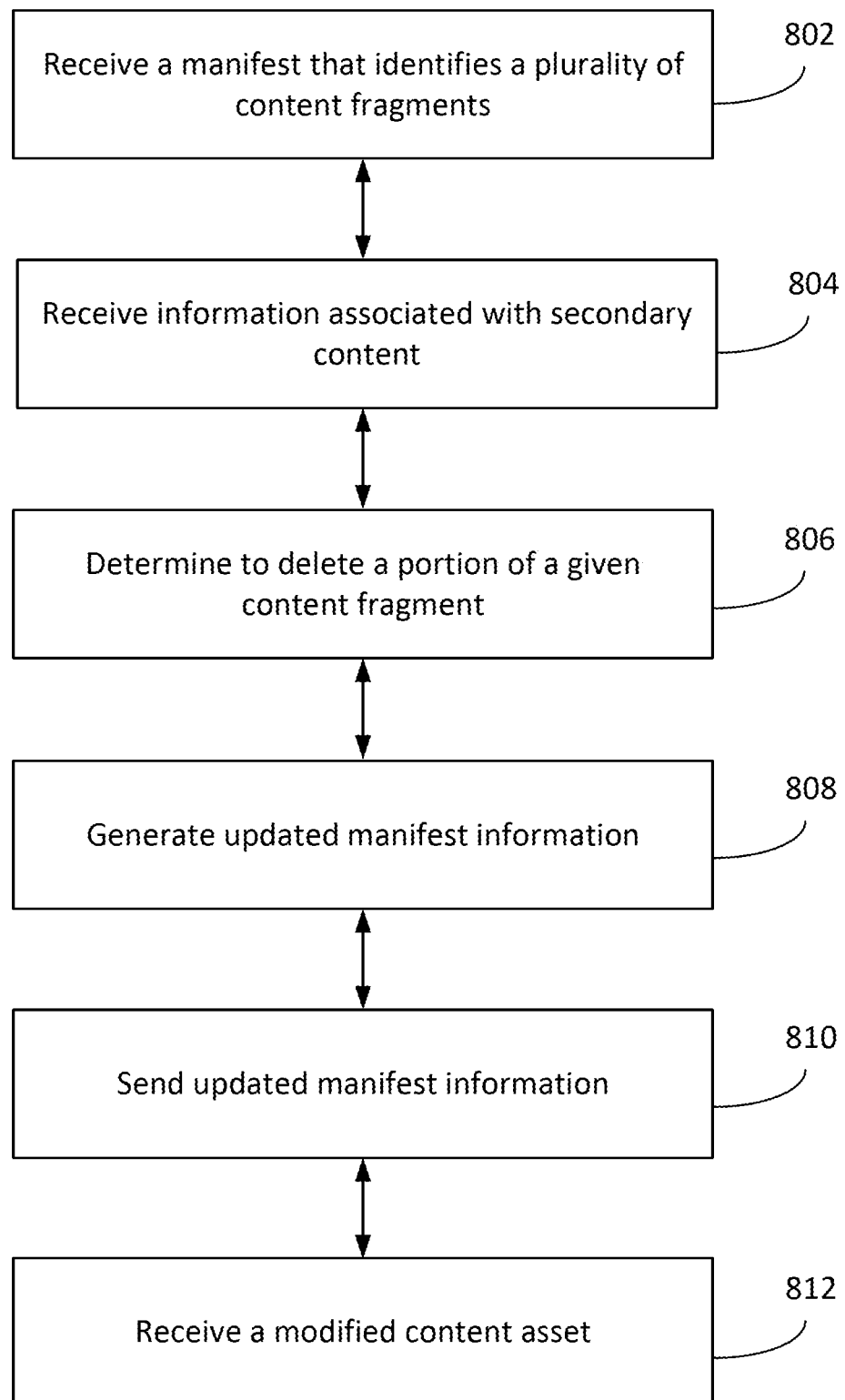
FIG. 8 shows a flow chart of an example method.

FIG. 8 shows a flow chart of an example method 800. At step 802, a manifest may be received. The manifest may be received at a device, such as the device 120 shown in FIG. 1. The device may be a playback device such as a set-top box. The manifest may be associated with a content asset. The content asset may be a movie, television, or audio program made available to the device by a content provider. The content asset may be divided into a plurality of content fragments. Each of the content fragments may represent a portion of the content asset.

At step 804, information associated with secondary content may be received. The information may identify a location in the content asset to insert the secondary content. The secondary content may be an advertisement, such as a personalized advertisement directed at the device, or any type of content capable of being inserted into the content asset. The location to insert the secondary content may fall within a duration of a given one of the content fragments. In the example that each content fragment is two seconds in length, the information may indicate to insert the secondary content halfway through a given content fragment (e.g., one second into the content fragment).

At step 806, the device may determine to delete a portion of the given content fragment. The device may determine that the portion of the given content fragment comprises expired content, such as an advertisement for a product that is no longer in circulation or content that is otherwise no longer desired in the content asset. Determining to delete the content fragment may comprise determining that another portion of the given content fragment is self-contained. In the example that the content fragment is two seconds in length and the instructions comprise an indication to insert secondary content halfway through the content asset, the device may determine that the portion of the content fragment after the insertion location of the secondary content corresponds to an expired advertisement. Thus, the device may determine to delete that portion of the content fragment. The device may determine that the portion of the content fragment before the insertion point of the secondary content is self-contained, meaning that it is capable of being played without reference to the portion of the content fragment that is to be deleted.

At step 808, updated manifest information may be generated. The updated manifest information may be generated by the device. The updated manifest information may identify the modified content fragment. The modified content fragment may have a playback duration that is different than the playback duration of the plurality of content fragments. The modified content fragment have a playback duration of one second while the plurality of original content fragments may have a playback duration of two seconds. The manifest may identify the secondary content for insertion into the content asset. The secondary content may be inserted at the boundary of the modified content fragment. Thus, the manifest may identify a one second content fragment followed by the secondary content.

At step 810, the updated manifest information may be sent to the content server. The updated manifest information may be sent to the same content server that sent the original manifest to the device. Additionally or alternatively, the updated manifest information may be sent to another content server that is configured to generate an updated content asset or to modify one or more fragments of an existing content asset. The content server may be configured to generate the modified content asset by modifying only the portion of the content asset that was modified in the updated manifest information. In an example that the content asset comprises 900 two-second content fragments with three scheduled thirty-second advertising breaks, the manifest may identify three modified content fragments, each of the modified content fragments being located immediately before or immediately after the secondary content insertion point. The content server may not need to modify any of the remaining 897 content fragments.

At step 812, a modified content asset may be received at the device. The modified content asset may comprise the modified content fragment. The modified content asset may comprise a portion of the original content fragments identified in the manifest. Thus, the modified content asset may comprise a plurality of content fragments having an equal playback duration and a modified content fragment having a playback duration different from the playback duration of the plurality of content fragments. In one example, the modified content asset may further comprise the secondary content.

While the description of FIG. 8 describes the steps of that figure as being performed by a device, it is understood that the device is not limited to the device 120 and that the steps may be performed by one or more other entities or components of the system 100.

The methods disclosed herein may be used to replace existing secondary content with new secondary content. Replacing existing secondary content may also require updates to the existing manifest. For example, a manifest may already exist for a given content asset, such as a television show. A new manifest may be generated that is specific to a given user of the system. Thus, when Viewer A orders the television show from the content provider, the content provider may generate a new manifest which is specific for Viewer A and has advertisements specific for Viewer A. In order to update the manifest for Viewer A for the content asset, the content provider may generate a manifest mimicking the original manifest up to the first adjusted fragment, then make references to the first adjusted fragment, the secondary content, and the second adjusted fragment, and complete the rest of the manifest mimicking the original manifest. The secondary content insertion point may be marked with a tag specific to the user, such as an event ID tag.

Figure 9:
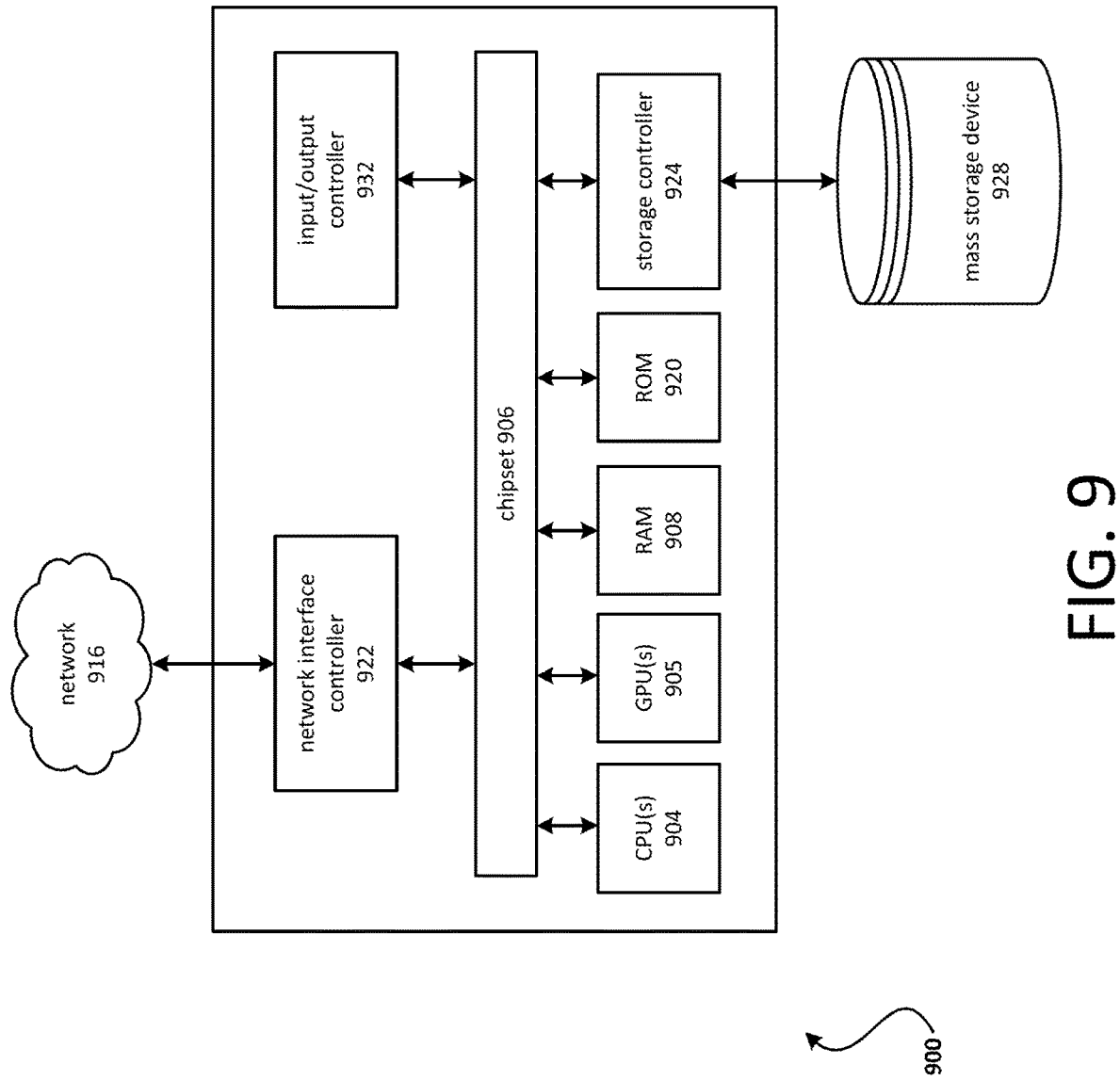
FIG. 9 shows a block diagram of an example computing device.

FIG. 9 depicts a computing device that may be used in various aspects, such as the servers, modules, and/or devices depicted in FIG. 1. With regard to the example architecture of FIG. 1, the transcoder 104, packager 106, origin server 108, and content delivery network 110 may each be implemented in an instance of a computing device 900 of FIG. 9. The computer architecture shown in FIG. 9 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 4 and 6-8.

The computing device 900 may include a baseboard, or "motherboard," which is a printed circuit board to which a multitude of components or devices may be connected by way of a system bus or other electrical communication paths. One or more central processing units (CPUs) 904 may operate in conjunction with a chipset 906. The CPU(s) 904 may be standard programmable processors that perform arithmetic and logical operations necessary for the operation of the computing device 900.

The CPU(s) 904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to generate more complex logic circuits including registers, adders-subtractors, arithmetic logic units, floating-point units, and the like.

The CPU(s) 904 may be augmented with or replaced by other processing units, such as GPU(s) 905. The GPU(s) 905 may comprise processing units specialized for but not necessarily limited to highly parallel computations, such as graphics and other visualization-related processing.

A chipset 906 may provide an interface between the CPU(s) 904 and the remainder of the components and devices on the baseboard. The chipset 906 may provide an interface to a random access memory (RAM) 908 used as the main memory in the computing device 900. The chipset 906 may provide an interface to a computer-readable storage medium, such as a read-only memory (ROM) 820 or non-volatile RAM (NVRAM) (not shown), for storing basic routines that may help to start up the computing device 900 and to transfer information between the various components and devices. ROM 820 or NVRAM may also store other software components necessary for the operation of the computing device 900 in accordance with the aspects described herein.

The computing device 900 may operate in a networked environment using logical connections to remote computing nodes and computer systems through local area network (LAN) 916. The chipset 906 may include functionality for providing network connectivity through a network interface controller (NIC) 922, such as a gigabit Ethernet adapter. A NIC 922 may be capable of connecting the computing device 900 to other computing nodes over a network 916. It should be appreciated that multiple NICs 922 may be present in the computing device 900, connecting the computing device to other types of networks and remote computer systems.

The computing device 900 may be connected to a mass storage device 928 that provides non-volatile storage for the computer. The mass storage device 928 may store system programs, application programs, other program modules, and data, which have been described in greater detail herein. The mass storage device 928 may be connected to the computing device 900 through a storage controller 924 connected to the chipset 906. The mass storage device 928 may consist of one or more physical storage units. A storage controller 924 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 900 may store data on a mass storage device 928 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 928 is characterized as primary or secondary storage and the like.

For example, the computing device 900 may store information to the mass storage device 928 by issuing instructions through a storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 900 may read information from the mass storage device 928 by detecting the physical states or characteristics of one or more particular locations within the physical storage units.

In addition to the mass storage device 928 described herein, the computing device 900 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 900.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 928 depicted in FIG. 9, may store an operating system utilized to control the operation of the computing device 900. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 928 may store other system or application programs and data utilized by the computing device 900.

The mass storage device 928 or other computer-readable storage media may also be encoded with computer-executable instructions, which, when loaded into the computing device 900, transforms the computing device from a general-purpose computing system into a special-purpose computer capable of implementing the aspects described herein. These computer-executable instructions transform the computing device 900 by indicating how the CPU(s) 904 transition between states, as described herein. The computing device 900 may have access to computer-readable storage media storing computer-executable instructions, which, when executed by the computing device 900, may perform the methods described in relation to FIGS. 4 and 6-8.

A computing device, such as the computing device 900 depicted in FIG. 9, may also include an input/output controller 932 for receiving and processing input from a number of input devices, such as a keyboard, a mouse, a touchpad, a touch screen, an electronic stylus, or other type of input device. Similarly, an input/output controller 932 may provide output to a display, such as a computer monitor, a flat-panel display, a digital projector, a printer, a plotter, or other type of output device. It will be appreciated that the computing device 900 may not include all of the components shown in FIG. 9, may include other components that are not explicitly shown in FIG. 9, or may utilize an architecture completely different than that shown in FIG. 9.

As described herein, a computing device may be a physical computing device, such as the computing device 900 of FIG. 9. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Example" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus generate a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are shown as being stored in memory or on storage while being used, and that these items or portions thereof may be transferred between memory and other storage devices for purposes of memory management and data integrity. Additionally or alternatively, in other embodiments, some or all of the software modules and/or systems may execute in memory on another device and communicate with the shown computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as example only, with a true scope and spirit being indicated by the following claims.

What is claimed:

1. A method comprising:
   receiving, at a device, a manifest that identifies a first content fragment and a second content fragment associated with a content asset;
   receiving, at the device, information associated with secondary content, the information identifying a location in the content asset to insert the secondary content, wherein the location falls within a duration of the first content fragment or the second content fragment;
   forwarding, from the device, one or more identifiers of the first content fragment and the second content fragment, and the location within the duration of the first content fragment or the second content fragment to insert the secondary content; and
   receiving, at the device, a first modified content fragment and a second modified content fragment, wherein a boundary between the first modified content fragment and the second modified content fragment coincides with the location to insert the secondary content.

2. The method of claim 1, wherein at least one of the first modified content fragment or the second modified content fragment comprises at least a portion of the first content fragment and at least a portion of the second content fragment.

3. The method of claim 1, further comprising generating, at the device, an updated manifest that identifies the first modified content fragment and the second modified content fragment.

4. The method of claim 3, further comprising generating, based on the updated manifest, a modified content asset comprising the first modified content fragment and the second modified content fragment.

5. The method of claim 4, further comprising causing presentation of the modified content asset comprising the first modified content fragment and the second modified content fragment.

6. The method of claim 1, wherein forwarding the one or more identifiers of the first content fragment and the second content fragment, and the location within the duration of the first content fragment or the second content fragment to insert the secondary content comprises not forwarding an updated manifest.

7. The method of claim 1, wherein:
   forwarding the one or more identifiers of the first content fragment and the second content fragment, and the location within the duration of the first content fragment or the second content fragment to insert the secondary content comprises forwarding, from the device and to a content server, the one or more identifiers of the first content fragment and the second content fragment, and the location within the duration of the first content fragment or the second content fragment to insert the secondary content; and
   receiving the first modified content fragment and the second modified content fragment comprises receiving, at the device and from the content server, the first modified content fragment and the second modified content fragment.

8. The method of claim 1, receiving the first modified content fragment and the second modified content fragment comprises receiving, at the device, one or more identifiers of the first modified content fragment and the second modified content fragment.

9. The method of claim 1, wherein the content asset comprises a plurality of content fragments comprising the first content fragment and the second content fragment.

10. The method of claim 1, wherein the first content fragment and the second content fragment each have an equal playback duration.

11. The method of claim 10, wherein the first modified content fragment and the second modified content fragment have different playback durations.

12. The method of claim 1, wherein the secondary content is an advertisement.

13. A device comprising:
   one or more processors; and
   memory storing instructions that, when executed by the one or more processors cause the device to:
      receive a manifest that identifies a first content fragment and a second content fragment associated with a content asset;
      receive information associated with secondary content, the information identifying a location in the content asset to insert the secondary content, wherein the location falls within a duration of the first content fragment or the second content fragment;
      forward one or more identifiers of the first content fragment and the second content fragment, and the location within the duration of the first content fragment or the second content fragment to insert the secondary content; and receive a first modified content fragment and a second modified content fragment, wherein a boundary between the first modified content fragment and the second modified content fragment coincides with the location to insert the secondary content.

14. The device of claim 13, wherein at least one of the first modified content fragment or the second modified content fragment comprises at least a portion of the first content fragment and at least a portion of the second content fragment.

15. The device of claim 13, wherein the instructions, when executed by the one or more processors, further cause the device to:
generate an updated manifest that identifies the first modified content fragment and the second modified content fragment.

16. The device of claim 15, wherein the instructions, when executed by the one or more processors, further cause the device to:
generate, based on the updated manifest, a modified content asset comprising the first modified content fragment and the second modified content fragment.

17. The device of claim 16, wherein the instructions, when executed by the one or more processors, further cause the device to:
cause presentation of the modified content asset comprising the first modified content fragment and the second modified content fragment.

18. The device of claim 13, wherein the instructions that, when executed by the one or more processors, cause the device to forward the one or more identifiers of the first content fragment and the second content fragment, and the location within the duration of the first content fragment or the second content fragment to insert the secondary content, further cause the device to not forward an updated manifest.

19. The device of claim 13, wherein the instructions that, when executed by the one or more processors, cause the device to forward the one or more identifiers of the first content fragment and the second content fragment, and the location within the duration of the first content fragment or the second content fragment to insert the secondary content, cause the device to:
forward, to a content server, the one or more identifiers of the first content fragment and the second content fragment, and the location within the duration of the first content fragment or the second content fragment to insert the secondary content; and
wherein the instructions that, when executed by the one or more processors, cause the device to receive the first modified content fragment and the second modified content fragment, cause the device to:
receive, from the content server, the first modified content fragment and the second modified content fragment.

20. The device of claim 13, wherein the instructions that, when executed by the one or more processors, cause the device to receive the first modified content fragment and the second modified content fragment, cause the device to receive one or more identifiers of the first modified content fragment and the second modified content fragment.

21. The device of claim 13, wherein the content asset comprises a plurality of content fragments comprising the first content fragment and the second content fragment.

22. The device of claim 13, wherein the first content fragment and the second content fragment each have an equal playback duration.

23. The device of claim 22, wherein the first modified content fragment and the second modified content fragment have different playback durations.

24. The device of claim 13, wherein the secondary content is an advertisement.

25. A non-transitory computer-readable medium storing instructions that, when executed, cause:
receiving, at a device, a manifest that identifies a first content fragment and a second content fragment associated with a content asset;
receiving, at the device, information associated with secondary content, the information identifying a location in the content asset to insert the secondary content, wherein the location falls within a duration of the first content fragment or the second content fragment;
forwarding, from the device, one or more identifiers of the first content fragment and the second content fragment, and the location within the duration of the first content fragment or the second content fragment to insert the secondary content; and
receiving, at the device, a first modified content fragment and a second modified content fragment, wherein a boundary between the first modified content fragment and the second modified content fragment coincides with the location to insert the secondary content.

26. The non-transitory computer-readable medium of claim 25, wherein at least one of the first modified content fragment or the second modified content fragment comprises at least a portion of the first content fragment and at least a portion of the second content fragment.

27. The non-transitory computer-readable medium of claim 25, wherein the instructions, when executed, further cause generating, at the device, an updated manifest that identifies the first modified content fragment and the second modified content fragment.

28. The non-transitory computer-readable medium of claim 27, wherein the instructions, when executed, further cause generating, based on the updated manifest, a modified content asset comprising the first modified content fragment and the second modified content fragment.

29. The non-transitory computer-readable medium of claim 28, wherein the instructions, when executed, further cause causing presentation of the modified content asset comprising the first modified content fragment and the second modified content fragment.

30. The non-transitory computer-readable medium of claim 25, wherein the instructions that cause forwarding the one or more identifiers of the first content fragment and the second content fragment, and the location within the duration of the first content fragment or the second content fragment to insert the secondary content, cause not forwarding an updated manifest.

31. The non-transitory computer-readable medium of claim 25, wherein the instructions that cause forwarding the one or more identifiers of the first content fragment and the second content fragment, and the location within the duration of the first content fragment or the second content fragment to insert the secondary content, cause forwarding, from the device and to a content server, the one or more identifiers of the first content fragment and the second content fragment, and the location within the duration of the first content fragment or the second content fragment to insert the secondary content; and wherein the instructions that cause receiving the first modified content fragment and the second modified content fragment, cause receiving, at the device and from the content server, the first modified content fragment and the second modified content fragment.

32. The non-transitory computer-readable medium of claim 25, wherein the instructions that cause receiving the first modified content fragment and the second modified content fragment, cause receiving, at the device, one or more identifiers of the first modified content fragment and the second modified content fragment.

33. The non-transitory computer-readable medium of claim 25, wherein the content asset comprises a plurality of content fragments comprising the first content fragment and the second content fragment.

34. The non-transitory computer-readable medium of claim 25, wherein the first content fragment and the second content fragment each have an equal playback duration.

35. The non-transitory computer-readable medium of claim 34, wherein the first modified content fragment and the second modified content fragment have different playback durations.

36. The non-transitory computer-readable medium of claim 25, wherein the secondary content is an advertisement.

* * * * *